(12) United States Patent
Thomas et al.

(10) Patent No.: US 6,636,857 B2
(45) Date of Patent: Oct. 21, 2003

(54) METHOD AND SYSTEM FOR WEB-BASED ASSET MANAGEMENT

(75) Inventors: Shawn Thomas, Austin, TX (US); Gregory Gray, Austin, TX (US); Michael Woodfin, Austin, TX (US); Warner Mizell, Austin, TX (US); Brian Thomas, Austin, TX (US)

(73) Assignee: Bluecurrent, Inc., Austin, TX (US)

(*) Notice: Subject to any disclaimer, the term of this patent is extended or adjusted under 35 U.S.C. 154(b) by 1 day.

(21) Appl. No.: 10/321,115

(22) Filed: Dec. 17, 2002

(65) Prior Publication Data

US 2003/0140046 A1 Jul. 24, 2003

Related U.S. Application Data

(60) Provisional application No. 60/342,031, filed on Dec. 18, 2001.

(51) Int. Cl.[7] .......................... G06F 17/30; G06F 15/16; G06F 12/00; G06F 11/30
(52) U.S. Cl. .......................... 707/10; 709/209; 711/173; 717/11; 717/173; 713/200; 713/182
(58) Field of Search .................. 707/10, 103 R; 711/173; 709/219; 717/11, 173; 713/200, 182

(56) References Cited

U.S. PATENT DOCUMENTS

| | | | | |
|---|---|---|---|---|
| 5,787,491 A | * | 7/1998 | Merkin et al. .............. 711/173 |
| 6,145,126 A | * | 11/2000 | Matsukura et al. .......... 717/11 |
| 6,327,617 B1 | * | 12/2001 | Fawcett ...................... 709/219 |
| 2002/0184619 A1 | * | 12/2002 | Meyerson ................... 717/173 |
| 2003/0079132 A1 | * | 4/2003 | Bryant ........................ 713/182 |
| 2003/0093688 A1 | * | 5/2003 | Helgesen et al. ........... 713/200 |

FOREIGN PATENT DOCUMENTS

GB        2 340 273 A    *  2/2000   ........... G06F/9/445

* cited by examiner

Primary Examiner—Frantz Coby
(74) Attorney, Agent, or Firm—William D. Wiese; Jenkens & Gilchrist, P.C.

(57) ABSTRACT

The method and system of the present invention provides an improved technique for replacing, implementing and managing computer-related assets. A technician accesses the World Wide Web through a user's computer. The information resident on the computer, including information regarding the computer and the user's preferences, are downloaded to a remote storage medium through the World Wide Web. Once downloaded, all information may be removed from the user's computer. Subsequently, the technician accesses another computer such as, for example, a new computer that has been assigned to the same user. The technician accesses the World Wide Web through the new computer and downloads the information previously stored on the remote storage medium. This information can then be used to install the user's prior applications, settings and preferences on the new computer.

35 Claims, 8 Drawing Sheets

FIG. 1

ACTIVITIES AT ORIGINAL DEVICE

ACTIVITIES AT NEW DEVICE

Location Information

FIG. 4

User Information

FIG. 5

Legacy Asset Information

FIG. 6

Application Information

FIG. 7

New Asset Information

FIG. 8

METHOD AND SYSTEM FOR WEB-BASED ASSET MANAGEMENT

PRIORITY STATEMENT UNDER 35 U.S.C. §119 & 37 C.F.R. §1.78

This non-provisional application claims priority based upon prior U.S. Provisional Patent Application Ser. No. 60/342,031 filed Dec. 18, 2001 in the names of Shawn Thomas, Gregory Gray, Michael Woodfin, Warner Mizell and Brian Thomas, entitled "Method and System for Deploying, Tracking and Managing Technology-Related Resources."

BACKGROUND OF THE INVENTION

1. Technical Field of the Invention

The present invention relates generally to a method and system for managing assets with technology that utilizes the World Wide Web. More particularly, the present invention provides a means for downloading information from a user's computer through the World Wide Web to a remote storage medium. The information can subsequently be used to integrate disparate systems, aggregate information regarding a company's assets, and perform other asset management functions. The information can also be uploaded from the remote storage medium to an alternate computer, for example after the user receives a new computer. The information that has been uploaded can be used to reinstall software, preferences and user settings on the new computer.

2. Description of Related Art

Computer-related technology is advancing at a remarkable rate. New technologies are being introduced daily that add new functionality or features to pre-existing technology. As these new technologies are introduced, the prices of devices that incorporate those technologies drop. As prices drop, more and more users are upgrading systems and adding new devices. Consequently, sales of computer-related devices are currently at an all-time high.

This trend most heavily impacts corporations with large investments in computer-related assets. However, the decision to upgrade to a new system is often only the beginning of the process. Once a new system has been selected and funds have been allocated for the acquisition, the questions remains of how best to replace, implement and manage the new assets. A poor or improper implementation can be extremely costly and disrupt an entire organization. Moreover, there is a strong trend in the industry currently towards paying fees for asset management on a per asset per month basis. Legacy systems are poorly equipped to accommodate such pricing models. A need exists, therefore, for an improved system and method for replacing, implementing and managing computer-related assets.

Existing systems and methods exist for replacing old computer-related assets. Typically, a computer technician would access the existing asset and make either handwritten notes of the user's setting and preferences or input the information into a computer and save it to a diskette. The technician would then download the information on the device's drive onto a portable medium. This process can take a considerable amount of time, is prone to technician error and results in a high labor cost due to the higher rates paid to computer technicians over general office laborers.

Existing methods are further limited because the information that is collected is not collected in such a manner that it can be compiled, managed and updated in the future. Under existing methods, once the computer technician re-installs the information on a new machine, he destroys any records that he may have kept relating, for example, to the specific versions of software installed, the serial number of the computer on which it was installed or the date of installation and, if the information is saved, it is usually not accessible in an organized, easily-accessible manner. Consequently, when the new machine is ready to be upgraded, relocated or decommissioned, the computer technician must start anew to gather information about it and the user's settings and preferences.

There is a need, therefore, for an improved method and system for replacing, implementing and managing computer-related assets.

SUMMARY OF THE INVENTION

The present invention addresses the need for an improved method and system for replacing, implementing and managing computer-related assets. The present invention provides a method of asset management in which a technician accesses the World Wide Web through a user's computer. The information resident on the computer, including information regarding the computer and the user's preferences, is downloaded to a remote storage medium through the World Wide Web. Once the information is downloaded, all information may be removed from the user's computer. Subsequently, the technician accesses another computer such as, for example, a new computer that has been assigned to the same user. The technician accesses the World Wide Web through the new computer and downloads the information previously stored on the remote storage medium. This information can then be used to install the user's prior applications, settings and preferences on the new computer.

The present invention also provides a method for asset management in which information that is downloaded from a user's computer at the time that a computer is installed or relocated is retained in a centralized database. Thereafter, the information can be accessed, modified and updated throughout the life of the computer.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS OF THE INVENTION

The numerous innovative teachings of the present application will be described with particular reference to the presently preferred exemplary embodiments. However, it should be understood that these embodiments provide only a few examples of the many advantageous uses of the innovative teachings herein. In general, statements made in the specification of the present application do not necessarily delimit any of the various claimed inventions. Moreover, some statements may apply to some inventive features, but not to others.

Figure 1:
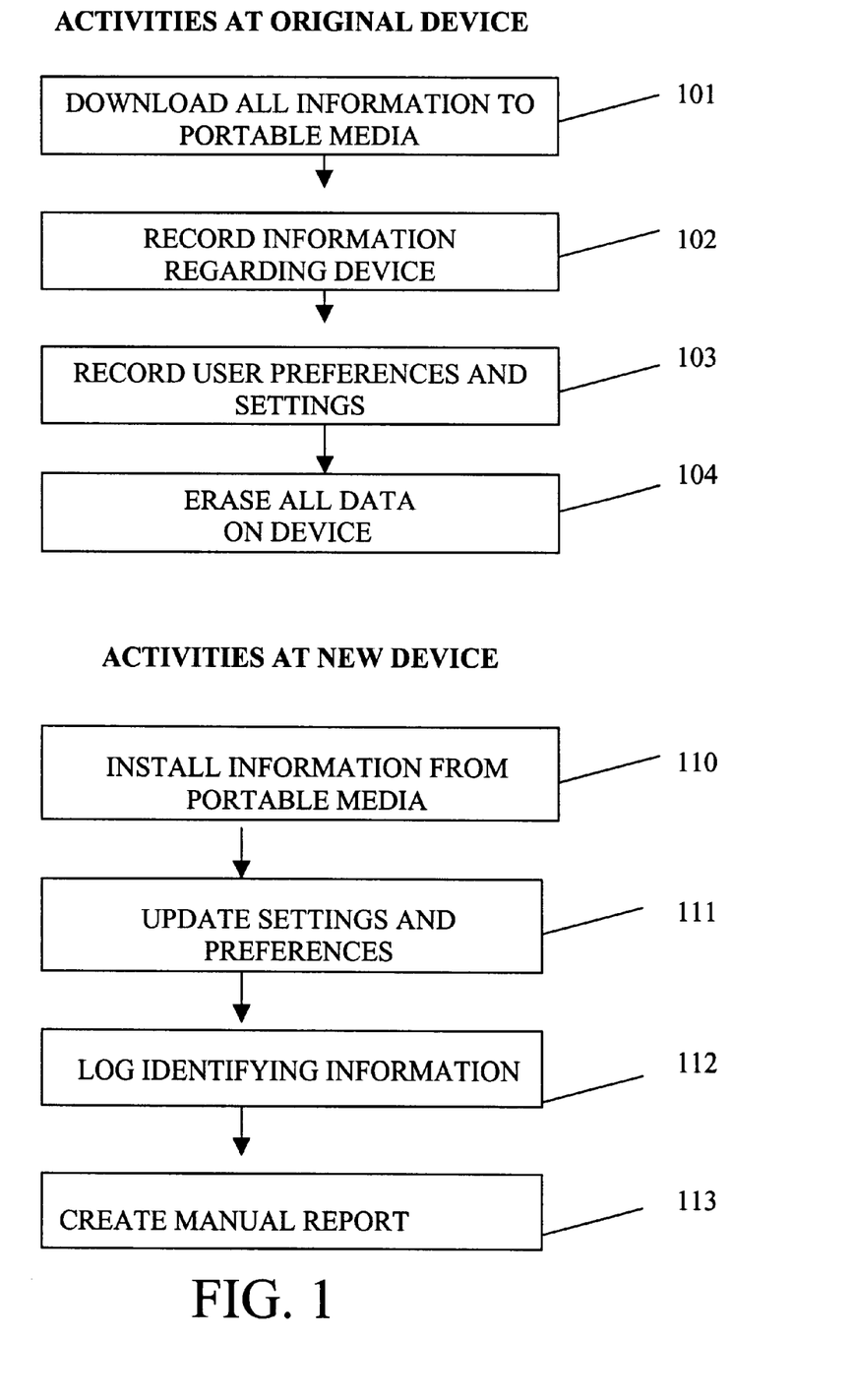
FIG. 1 is a flow diagram of a typical asset deployment workflow process.

A typical asset deployment work flow is illustrated in FIG. 1. Typically, a technician would begin by accessing the original computer-related hardware device. He would download all data to portable media 101. For example, the technician may download all data to a CD-ROM, tape drive or another attached portable hard drive. Thereafter, the technician would perform a visual inspection of the device and record information concerning the device 102 obtained, including such information as the software applications installed on the machine, the serial number of the machine, the hardware attached to the machine, and other information concerning the type and nature of the user's equipment. The technician will next record user preferences and settings 103. This information may include the user's bookmarks, recorded passwords, and other information specific to the individual user. Once the information has been obtained and recorded, the technician will proceed to erase all data on the device 104. The original device is then ready for disposition.

Either the same or a new technician will be responsible for installing the user's information on a new device. Once again referring to FIG. 1, the technician will begin by installing the information on the device from the portable media 110. Once the information has been installed, the technician will proceed to update the user's settings and preferences 111. The technician will then inspect the device to determine identifying information 112 such as the device's serial number and the software installed. Thereafter, the technician will create a manual report 113 of all activities related to the user's devices. The process undertaken by the technician is cumbersome due to the slow speeds at which data is transferred from the device to the portable media. In addition, the process is costly because an experienced computer technician is needed to transfer the files and update the user's settings and preferences. Moreover, there is a risk that the information stored on the portable media may be lost while being transported.

Figure 2:
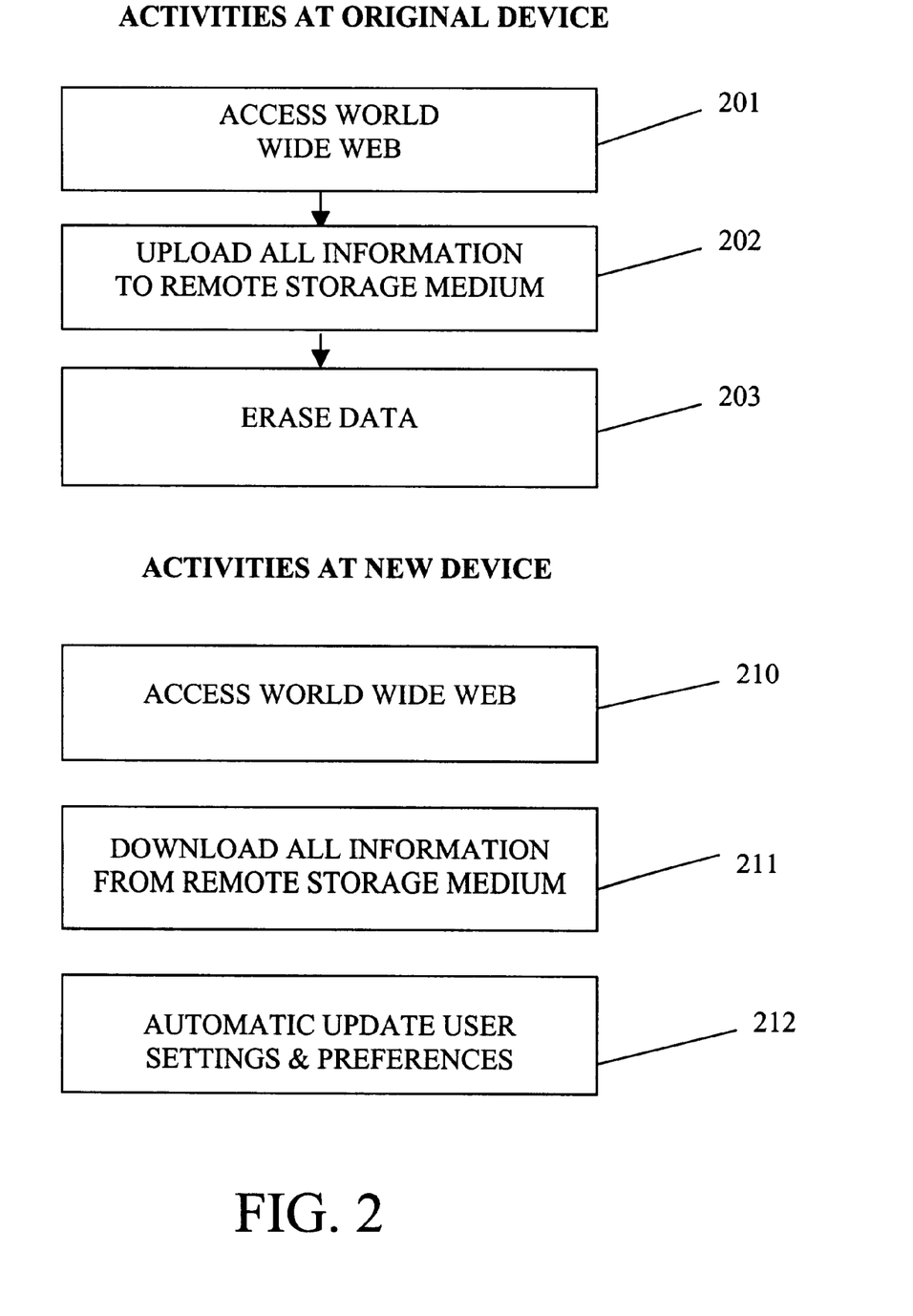
FIG. 2 is a workflow diagram showing the preferred method for asset management according to the present invention.

A preferred method for asset management is shown in FIG. 2. The work flow is a highly generalized overview of non-industry specific deployment and does not take into account such activities as future asset management, integration of disparate systems, data assimilation and the like, all of which may be performed as part of this invention. The method commences when a technician accesses the World Wide Web 201 through the user's computer-related hardware device such as a desktop computer, laptop computer, hand-held computer, printer, scanner, networking device or storage device. The technician can access the World Wide Web 201 through the internet, a local area network, or other methods known in the art. Once the technician has access to the World Wide Web, he proceeds to upload all information from the device to a remote storage medium 202. The information may be transferred through a secure, encrypted transmission so as to protect the confidentiality of the information. Additionally, the information may be converted to formatted data files prior to transmission for ease of storage and transfer. The information transferred contains information regarding the user's preferences and settings and the user's overall equipment configuration. Once the information has been uploaded by the technician, the technician can erase all data 203 residing on the device. The device may then be disposed of without further activity.

The same or a new technician can then install the information on the new device. The technician will proceed by first accessing the World Wide Web 210 to access the remote storage medium on which the user's information is stored. The information may be stored on the remote storage medium in a database, such as a relational database. In addition, the technician will next download all information relating to the user from the remote storage medium 211. This process may include, for example, a filter so that unwanted or redundant files will not be transferred. Once the information has been downloaded to the new device the system can automatically update user settings and preferences 212.

The improved process described in FIG. 2 has a number of advantages over the prior art. For example, the transfer of information occurs rapidly so that the transfer of data to the new device can occur on a real time basis. In addition, because the information is held in electronic form, a wide variety of reports can be generated relating to the information resident on the user's computer. Also, because software is being installed electronically, a means exists for monitoring, updating and controlling versions of software resident on the device. Another benefit is the ability to translate information being transmitted between devices into a common language.

It will be understood by those skilled in the art that certain information regarding a user's settings, preferences or equipment may not be included within the information transmitted to the remote storage medium and therefore may not be available to update the new device. In such cases, it is anticipated that, as part of the present invention, a combination of the foregoing Web-based asset management and traditional techniques for updating user's settings, preferences and equipment list would be used. For example, when information is downloaded from the remote storage medium 211, a method may be employed whereby the device assesses what information it requires has not been downloaded. Thereafter, the device would be programmed to prompt the user to provide such information.

Figure 3:
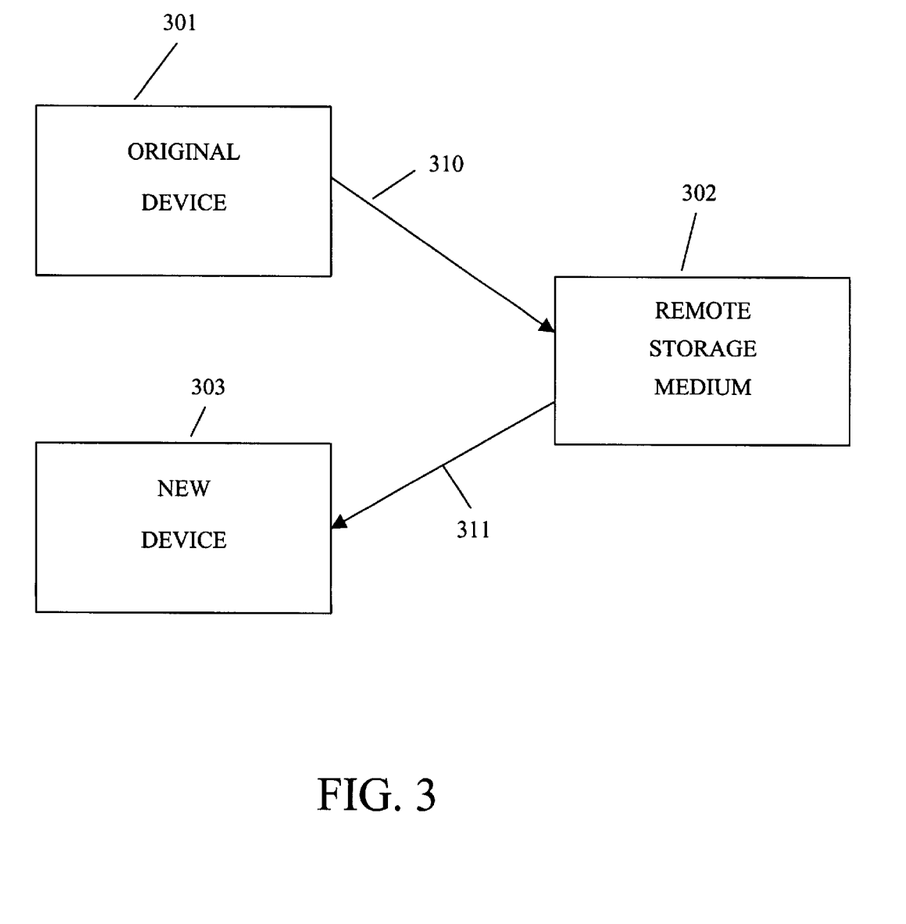
FIG. 3 is a system diagram showing the preferred system for asset management.

A system for Web-based asset management is shown in FIG. 3. The system preferably comprises an original device 301, a remote storage medium 302 and a new device 303. The original device 301 and the new device 303 both have access to the World Wide Web. The system described herein provides a means for transferring information from the original device through the World Wide Web to a remote storage medium 310. In addition, the system provides a means 311 for transferring information from the remote storage medium to a new device through the World Wide Web. As has been previously described, the transfer of information from the original device through the remote storage medium to the new device is completed once the user's preferences and profile settings have been completed.

Figure 4:
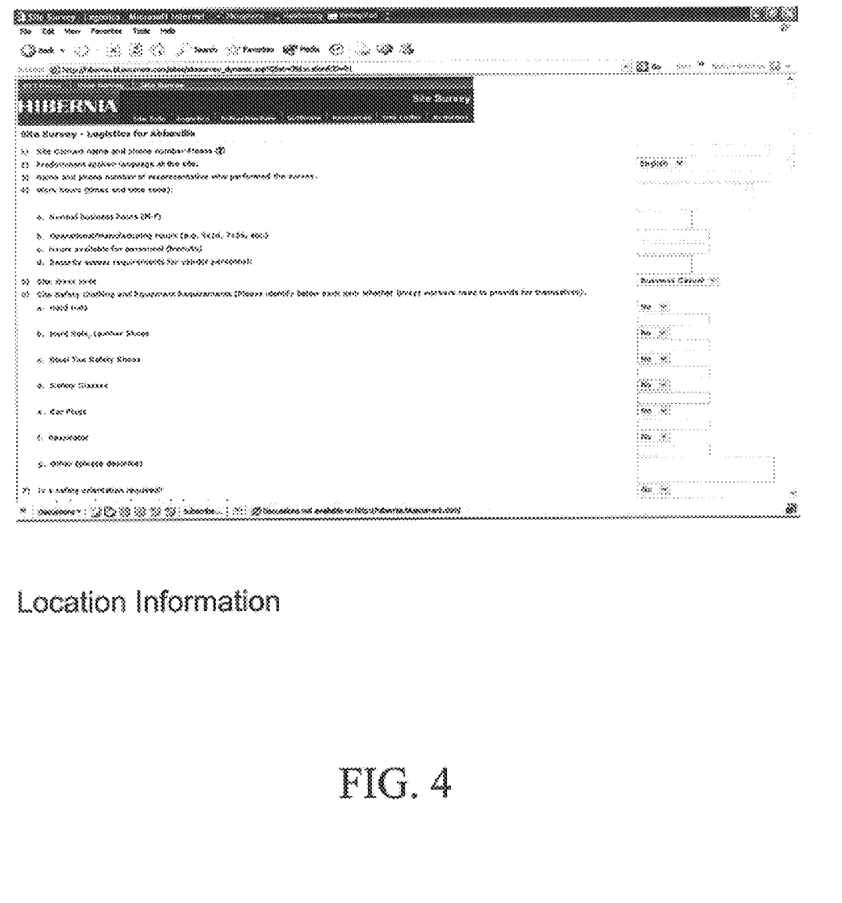
FIG. 4 is a typical screen display used in the preferred method for asset management showing how a technician is prompted for location information.

FIG. 4 depicts a meeting display showing how a technician may be prompted to input information regarding the location in which the equipment exists. Basic information is included on the form such as, for example, site contact and phone number, language predominantly spoken at the site, and the name of the representative who performed the survey. The input of this information provides a valuable resource within the overall method and system because future users can refer back to the information when subsequent visits are planned.

Figure 5:
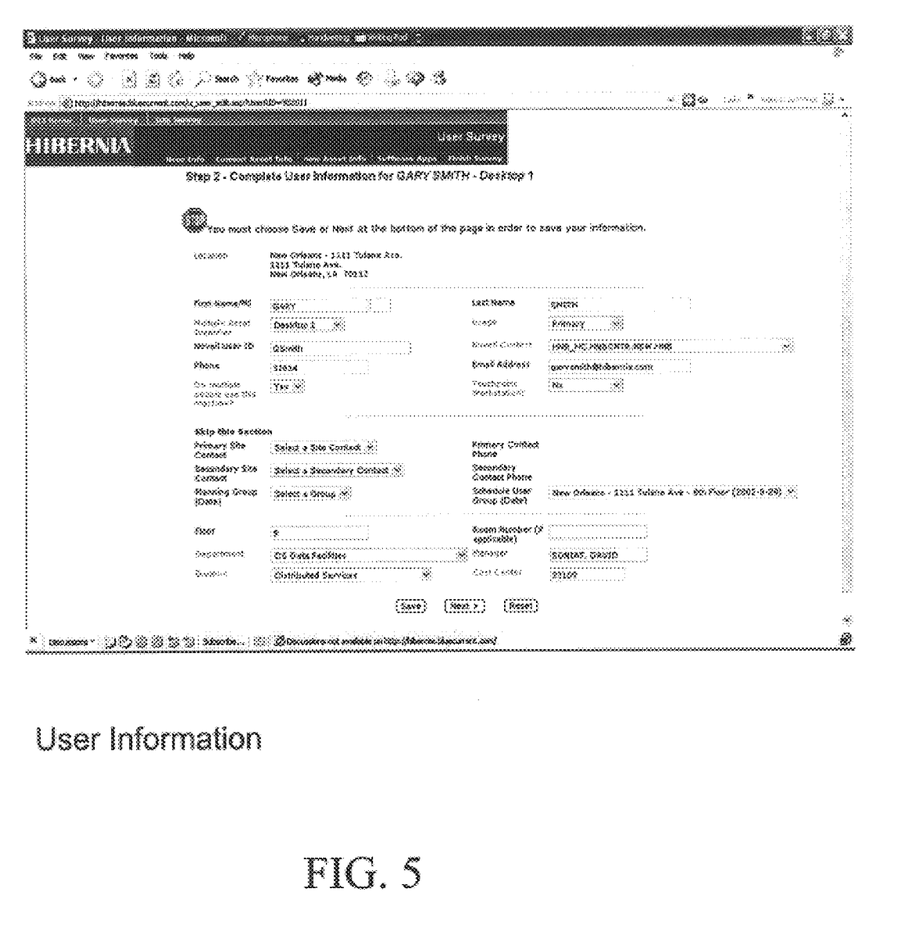
FIG. 5 is a typical screen display used in the preferred method for asset management showing how a technician is prompted for user information.

FIG. 5 presents a screen display showing how a technician may be prompted to input information regarding the device's user. The information to be input will include such information as first name, last name, user ID and email address. This information can be used by the system for validating the user's name and access authority.

Figure 6:
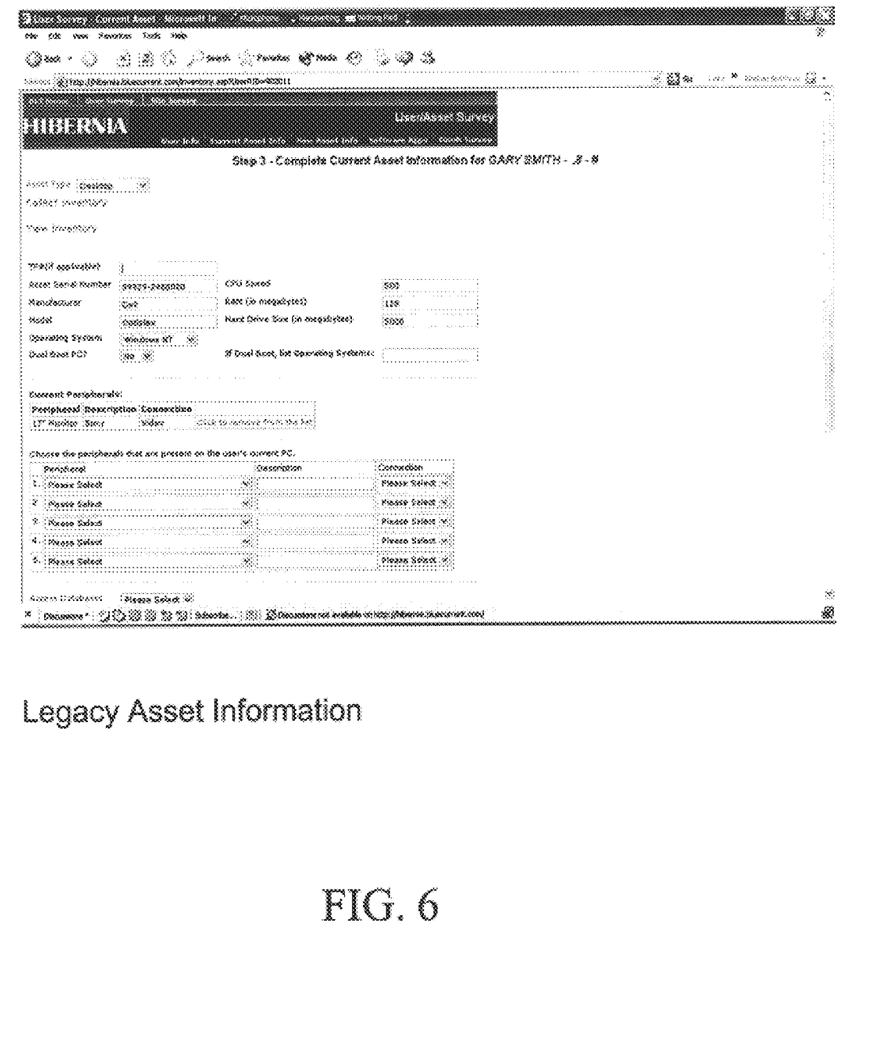
FIG. 6 is a typical screen display used in the preferred method for asset management showing how a technician is prompted for legacy asset information.

FIG. 6 depicts a screen display that may be accessed by the technician for the purpose of inputting legacy asset information. The screen display prompts the technician to input such information as the asset type, manufacturer, model, serial number and peripherals. This information is critical to the system for the future configuration of the user's devices.

Figure 7:
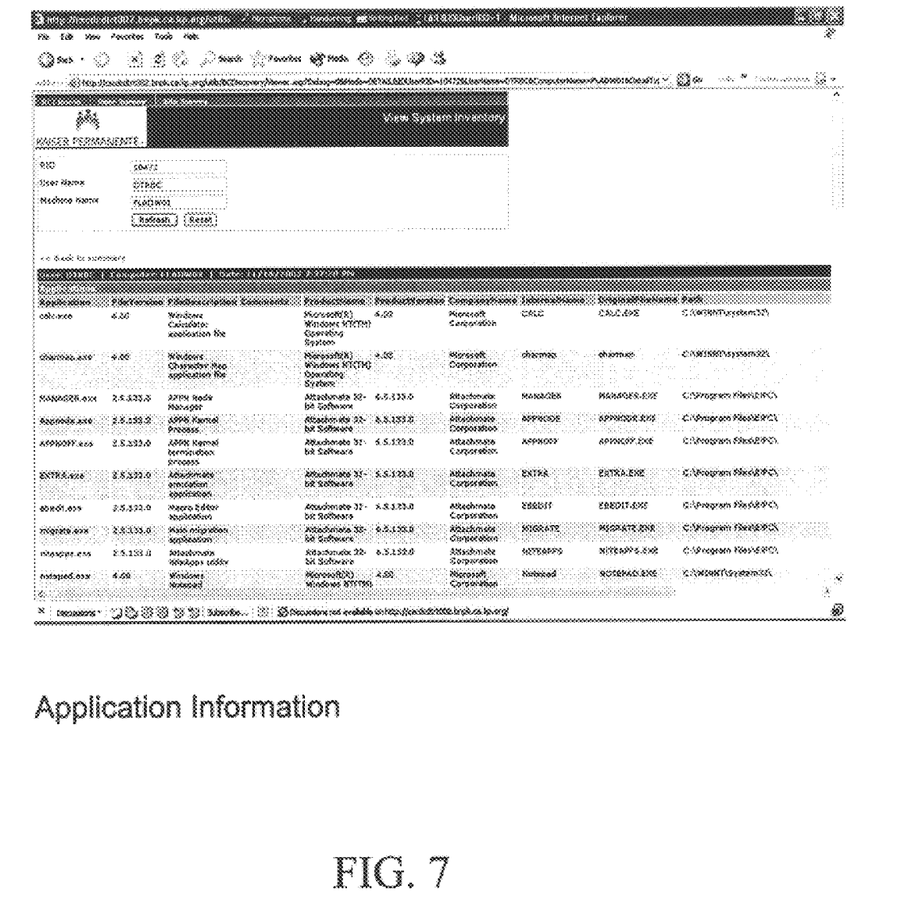
FIG. 7 is a typical screen display used in the preferred method for asset management showing how a technician is prompted for application information.

FIG. 7 shows a screen display that may be used to prompt a technician to input information regarding the existing applications on a user's device. The display will first prompt a technician to input a user name and the machine name. The program will then automatically discover the applications on the device, a procedure which is known in the art. Once the information is obtained, it is combined with the user name and machine name previously entered.

Figure 8:
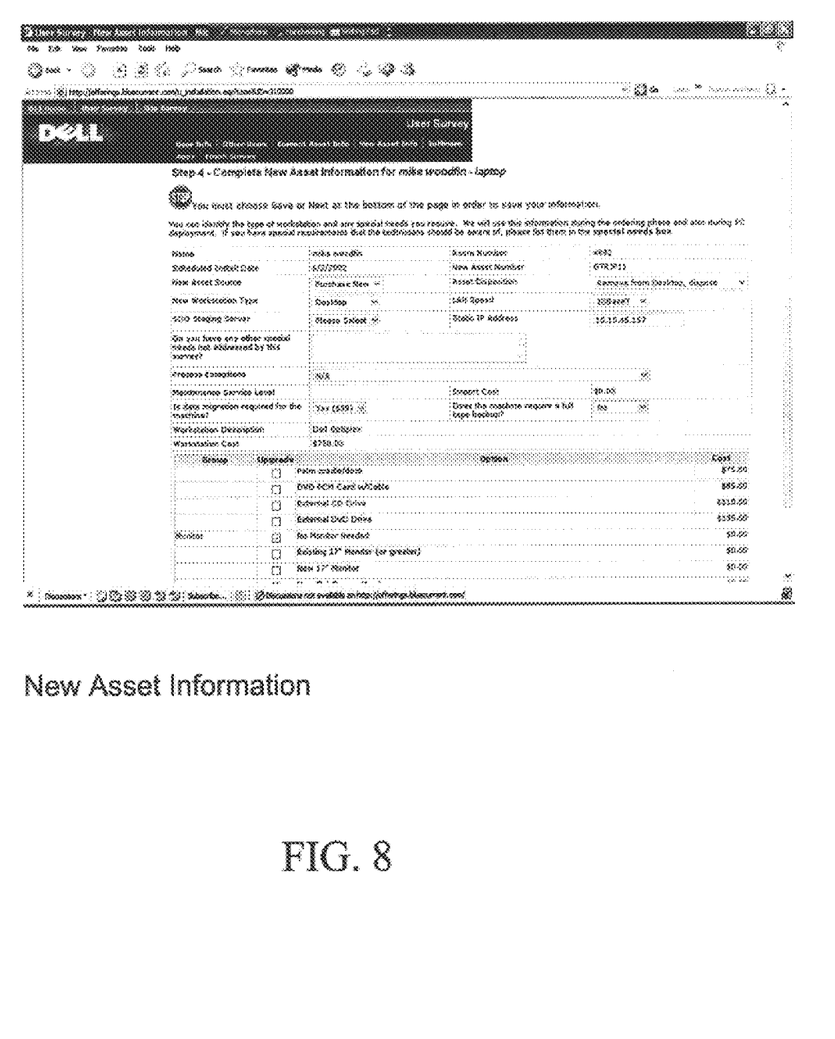
FIG. 8 is a typical screen display used in the preferred method for asset management showing how a technician is prompted for new asset information.

FIG. 8 provides a depiction of a screen display in which a technician may be prompted to input information regarding the new asset. Information that may be requested includes the scheduled installation date, the new asset source, the new work station type and the location of the new asset.

We claim:

1. A method for asset management utilizing the World Wide Web, comprising:
   Accessing the World Wide Web using a user's computer-related hardware device;
   transferring information from said computer-related hardware device through said World Wide Web to a remote storage medium;
   transferring said information from said remote storage medium to a new computer-related hardware device; and
   using said information from said computer-related hardware device on said new computer-related hardware device to update said user's settings on said new computer-related hardware device.

2. The method of claim 1 wherein said computer-related hardware device is selected from the group consisting of desktop computers, laptop computers, handheld computers, printers, scanners, networking devices and storage devices.

3. The method of claim 1 wherein the method of accessing said World Wide Web is over the Internet.

4. The method of claim 1 wherein the method of accessing said World Wide Web is through a local area network.

5. The method of claim 3 or claim 4 wherein said method of accessing said World Wide Web incorporates secure, encrypted transmission.

6. The method of claim 1 wherein said information is converted to formatted data files for ease of storage and transfer prior to said transmission to said new computer-related hardware device.

7. The method of claim 1 wherein said information is stored on said remote storage medium in a relational database.

8. The method of claim 1 wherein said information is continuously updated on a real-time basis.

9. The method of claim 1 wherein said method includes means for generating a report of said information after said user's new computer-related hardware device has been updated.

10. The method of claim 1 wherein said means for transferring information from said computer-related hardware device through said World Wide Web to said remote storage medium includes a method for filtering unwanted or redundant information.

11. The method of claim 1 wherein said updating of said user's settings consists of the steps of:
    inputting said user's settings from information that is available on said remote storage medium;
    assessing which of said settings were not included on said remote storage medium; and
    prompting said user to provide information regarding those settings that were not included on said remote storage medium.

12. The method of claim 1 wherein said method has the ability to monitor, update and control versions of software resident on said computer-related hardware device.

13. The method of claim 1 wherein said method provides a means for translating said information into a common language.

14. A system for asset management utilizing the World Wide Web, comprising:
    a user's computer-related hardware device, said computer-related hardware device having access to the World Wide Web;
    a new-computer-related hardware device for said user, said new computer-related hardware device having access to the World Wide Web;
    means for transferring information from said computer-related hardware device through said World Wide Web to a remote storage medium;
    means for transferring said information from said remote storage medium to said new computer-related hardware device; and
    means for using said information from said computer-related hardware device on said new computer-related hardware device to update said user's settings on said new computer-related hardware device.

15. The system of claim 14 wherein said computer-related hardware device is selected from the group consisting of desktop computers, laptop computers, handheld computers, printers, scanners, networking devices and storage devices.

16. The system of claim 14 wherein the method of accessing said World Wide Web is over the Internet.

17. The system of claim 14 wherein the method of accessing said World Wide Web is through a local area network.

18. The system of claim 15 or claim 16 wherein said method of accessing said World Wide Web incorporates secure, encrypted transmission.

19. The system of claim 14 wherein said information is converted to formatted data files for ease of storage and transfer prior to said transmission to said new computer-related hardware device.

20. The system of claim 14 wherein said information is stored on said remote storage medium in a relational database.

21. The system of claim 14 wherein said information is continuously updated on a real-time basis.

22. The system of claim 14 wherein said system includes means for generating a report of said information after said new computer-related hardware device has been updated.

23. The system of claim 14 wherein said means for transferring information from said computer-related hardware device through said World Wide Web to said remote storage medium includes a method for filtering unwanted or redundant information.

24. The system of claim 14 wherein said updating of said user's settings consists of the steps of:
inputting said user's settings from information that is available on said remote storage medium;
assessing which of said user's settings were not included on said remote storage medium; and
prompting said user to provide information regarding those settings that were not included on said remote storage medium.

25. A method for asset management using the World Wide Web, comprising:
accessing the World Wide Web through a series of computer-related hardware devices connected to a network;
transferring information regarding each computer-related hardware device in said series of computer-related hardware devices to a remote storage medium;
compiling information related to said series of computer-related hardware devices derived from said information residing on said remote storage medium; and
preparing and disseminating reports compiled from said information.

26. The method of claim 25 wherein said computer-related hardware devices are selected from the group consisting of desktop computers, laptop computers, handheld computers, printers, scanners, networking devices and storage devices.

27. The method of claim 25 wherein the method of accessing said World Wide Web is over the Internet.

28. The method of claim 25 wherein the method of accessing said World Wide Web is through a local area network.

29. The method of claim 27 or claim 28 wherein said method of accessing to said World Wide Web incorporates secure, encrypted transmission.

30. The method of claim 25 wherein said information is converted to formatted data files for ease of storage and transfer prior to said transmission to said new computer-related hardware device.

31. The method of claim 25 wherein said information is stored on said remote storage medium in a relational database.

32. The method of claim 25 wherein said information is continuously updated on a real-time basis.

33. The method of claim 25 wherein said means for transferring information from said computer-related hardware device through said World Wide Web to said remote storage medium includes a method for filtering unwanted or redundant information.

34. The method of claim 25 wherein said method has the ability to monitor, update and control versions of software resident on said computer-related hardware device.

35. The method of claim 25 wherein said method provides a means for translating said information into a common language.

* * * * *